(12) United States Patent
Xiong

(10) Patent No.: US 12,456,171 B2
(45) Date of Patent: Oct. 28, 2025

(54) IMAGE QUALITY ADJUSTMENT METHOD AND APPARATUS, DEVICE, AND MEDIUM

(71) Applicant: Beijing Zitiao Network Technology Co., Ltd., Beijing (CN)

(72) Inventor: Yineng Xiong, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/540,532

(22) Filed: Dec. 14, 2023

(65) Prior Publication Data

US 2024/0127406 A1 Apr. 18, 2024

Related U.S. Application Data

(63) Continuation of application No. PCT/CN2022/112786, filed on Aug. 16, 2022.

(30) Foreign Application Priority Data

Aug. 18, 2021 (CN) .......................... 202110950397.0

(51) Int. Cl.
- *G06T 5/60* (2024.01)
- *G06T 7/00* (2017.01)
- *G06V 20/40* (2022.01)

(52) U.S. Cl.
CPC .............. *G06T 5/60* (2024.01); *G06T 7/0002* (2013.01); *G06V 20/41* (2022.01); *G06V 20/46* (2022.01);
(Continued)

(58) Field of Classification Search
CPC ..................... G06T 5/60; G06T 7/0002; G06T 2207/10016; G06T 2207/20081;
(Continued)

(56) References Cited

U.S. PATENT DOCUMENTS

| | | | |
|---|---|---|---|
| 2008/0317358 A1 | 12/2008 | Bressan et al. | |
| 2009/0290807 A1* | 11/2009 | Marchesotti | ............. H04N 5/57 382/261 |

(Continued)

FOREIGN PATENT DOCUMENTS

| | | |
|---|---|---|
| CN | 103617432 A | 3/2014 |
| CN | 107846625 A | 3/2018 |

(Continued)

OTHER PUBLICATIONS

Bressan, Marco, Gabriela Csurka, and Sebastien Favre. "Towards intent dependent image enhancement-state-of-the-art and recent attempts." VISAPP (2). 2007. (Year: 2007).*

(Continued)

*Primary Examiner* — Jonathan S Lee
(74) *Attorney, Agent, or Firm* — Astute IP Law Group

(57) ABSTRACT

Embodiments of the present disclosure provide an image quality adjustment method and apparatus, a device, and a medium, and the method includes: acquiring a multimedia resource, in which the multimedia resource includes a video or an image; determining a scene detection result and an image quality detection result corresponding to the multimedia resource, in which the scene detection result is used to indicate a semantic result of at least one dimension of the multimedia resource, and the image quality detection result is used to indicate image quality of the multimedia resource; and determining an image quality enhancement strategy based on the scene detection result and the image quality detection result, and performing image quality enhancement processing on the multimedia resource according to the image quality enhancement strategy, in which the image quality enhancement strategy includes at least one image quality enhancement algorithm.

11 Claims, 4 Drawing Sheets

(52) U.S. Cl.
CPC .... *G06V 20/49* (2022.01); *G06T 2207/10016* (2013.01); *G06T 2207/20081* (2013.01); *G06T 2207/20084* (2013.01); *G06T 2207/30168* (2013.01)

(58) Field of Classification Search
CPC ........... G06T 2207/20084; G06T 2207/30168; G06V 20/49; G06V 20/46; G06V 20/41
USPC ........................................................ 382/159
See application file for complete search history.

(56) References Cited

U.S. PATENT DOCUMENTS

| | | | | |
|---|---|---|---|---|
| 2010/0014776 | A1* | 1/2010 | Marchesotti | G06V 40/162 382/275 |
| 2012/0269441 | A1 | 10/2012 | Marchesotti et al. | |

FOREIGN PATENT DOCUMENTS

| | | | | |
|---|---|---|---|---|
| CN | 109685726 | A | 4/2019 | |
| CN | 110738611 | A | 1/2020 | |
| CN | 110781740 | A | 2/2020 | |
| CN | 110933490 | A | 3/2020 | |
| CN | 111031346 | A | 4/2020 | |
| CN | 111163349 | A | 5/2020 | |
| CN | 109525901 | B | 8/2020 | |
| CN | 113014992 | A | 6/2021 | |
| CN | 113055580 | A | 6/2021 | |
| CN | 111031346 | B * | 11/2021 | ........... H04N 21/234 |
| JP | 2003134435 | A | 5/2003 | |
| JP | 2007129756 | A | 5/2007 | |
| JP | 2008-518334 | A | 5/2008 | |
| JP | 2008199464 | A | 8/2008 | |
| JP | 2011166315 | A | 8/2011 | |
| JP | 2012049841 | A | 3/2012 | |
| WO | 2021082171 | A1 | 5/2021 | |

OTHER PUBLICATIONS

Tsukada, Masato, et al. "Image quality enhancement method based on scene category classification and its evaluation." 2009 Digest of Technical Papers International Conference on Consumer Electronics. IEEE, 2009. (Year: 2009).*
Lee, Yoon-Gyoo, et al. "Content dependent selection of image enhancement parameters for mobile displays." Color Imaging XVI: Displaying, Processing, Hardcopy, and Applications. vol. 7866. SPIE, 2011. (Year: 2011).*
Hu, Hao. "Video enhancement: content classification and model selection." (2010). (Year: 2010).*
Lin, Guo-Shiang, and Xian-Wei Ji. "Video quality enhancement based on visual attention model and multi-level exposure correction." Multimedia Tools and Applications 75.16 (2016): 9903-9925. (Year: 2016).*
Choudhury, Anustup, and Gerard Medioni. "A framework for robust online video contrast enhancement using modularity optimization." IEEE transactions on circuits and systems for video technology 22.9 (2012): 1266-1279. (Year: 2012).*
Extended European Search Report for European Patent Application No. 22857804.3, mailed on Oct. 18, 2024, 9 pages.
Office Action received for Japanese Patent Application No. 2023-577180, mailed on Jan. 7, 2025, 5 pages (2 pages of English Translation and 3 pages of Original Document).
Office Action for Chinese Patent Application No. 202110950397.0, mailed on Feb. 21, 2025, 17 pages.
Office Action for Japanese Patent Application No. 2023-577180, mailed on May 7, 2025, 4 pages.
Office Action for Chinese Patent Application No. 202110950397.0, mailed on Jul. 4, 2025, 10 pages.

* cited by examiner

| Scene and Image Quality | Image Quality Enhancement Strategy |
|---|---|
| Night Scene: true<br>Underexposure: true<br>Noise: [a, b]<br>Human Face: true<br>Blur: false | |
| Night Scene: true<br>Underexposure: true<br>Noise: <a<br>Human Face: false<br>Blur: true | |
| Night Scene: true<br>Underexposure: true<br>Noise: [a, b]<br>Human Face: false<br>Blur: true | |
| ... | ... |

● Noise Reduction
● Color Brightness Enhancement
○ Skin Tone Protection
● Sharpening

FIG. 4

IMAGE QUALITY ADJUSTMENT METHOD AND APPARATUS, DEVICE, AND MEDIUM

CROSS-REFERENCE TO RELATED APPLICATION

This application is a continuation of International Application No. PCT/CN2022/112786 filed on Aug. 16, 2022, which claims the priority to and benefits of Chinese Patent Application No. 202110950397.0, filed on Aug. 18, 2021. All the aforementioned patent applications are hereby incorporated by reference in their entireties.

TECHNICAL FIELD

The present disclosure relates to the field of image processing technology and, in particular, to an image quality adjustment method and apparatus, a device, and a medium.

BACKGROUND

With the continuous development of Internet technologies and electronic devices, users have increasingly high requirements on image quality of an image or a video.

To improve user experience, image quality enhancement may be performed based on an image quality enhancement algorithm. However, the current image quality enhancement manners are relatively simple, and image quality enhancement effect cannot meet the requirements of the users.

SUMMARY

In order to solve the above-mentioned technical problems or at least partially solve the above-mentioned technical problems, the present disclosure provides an image quality adjustment method and apparatus, a device, and a medium.

Embodiments of the present disclosure provide an image quality adjustment method, and the method includes:

acquiring a multimedia resource, in which the multimedia resource includes a video or an image;

determining a scene detection result and an image quality detection result corresponding to the multimedia resource, in which the scene detection result is used to indicate a semantic result of at least one dimension of the multimedia resource, and the image quality detection result is used to indicate image quality of the multimedia resource;

and determining an image quality enhancement strategy based on the scene detection result and the image quality detection result, and performing image quality enhancement processing on the multimedia resource according to the image quality enhancement strategy, in which the image quality enhancement strategy includes at least one image quality enhancement algorithm.

The embodiments of the present disclosure further provide an image quality adjustment apparatus, and the apparatus includes:

a resource acquiring module, which is configured to acquire a multimedia resource, in which the multimedia resource includes a video or an image;

a scene image quality module, which is configured to determine a scene detection result and an image quality detection result corresponding to the multimedia resource, in which the scene detection result is used to indicate a semantic result of at least one dimension of the multimedia resource, and the image quality detection result is used to indicate image quality of the multimedia resource;

and an image quality enhancement module, which is configured to determine an image quality enhancement strategy based on the scene detection result and the image quality detection result, and perform image quality enhancement processing on the multimedia resource according to the image quality enhancement strategy, in which the image quality enhancement strategy includes at least one image quality enhancement algorithm.

The embodiments of the present disclosure further provide an electronic device, and the electronic device includes a processor, and a memory which is configured to store instructions that can be executed by the processor; and the processor is configured to read the instructions from the memory, and execute the instructions to implement the image quality adjustment method provided by the embodiments of the present disclosure.

The embodiments of the present disclosure further provide a computer-readable storage medium, the computer-readable storage medium stores a computer program, and the computer program is used to perform the image quality adjustment method provided by the embodiments of the present disclosure.

The embodiments of the present disclosure further provide a computer program product, including a computer program/instruction, and when the computer program/instruction is executed by a processor, the image quality adjustment method provided by the embodiments of the present disclosure is implemented.

The technical solution provided by the embodiments of the present disclosure has the following advantages. The image quality adjustment method provided by the embodiments of the present disclosure includes: acquiring a multimedia resource, in which the multimedia resource includes a video or an image; determining a scene detection result and an image quality detection result corresponding to the multimedia resource; and determining an image quality enhancement strategy based on the scene detection result and the image quality detection result, and performing image quality enhancement processing on the multimedia resource according to the image quality enhancement strategy, in which the image quality enhancement strategy includes at least one image quality enhancement algorithm. With the above technical solution, the corresponding image quality enhancement strategy can be determined based on the scene and image quality of the video or image, and the image quality enhancement strategy is used to enhance the image quality effect. Because the image quality enhancement strategy is determined based on information in two dimensions of the scene and the image quality, and can be combined with one or more image quality enhancement algorithms, adaptive and targeted image quality enhancement can be achieved, which significantly improves the effect of image quality enhancement, thereby greatly improving the user experience.

BRIEF DESCRIPTION OF DRAWINGS

The above-mentioned and other features, advantages and aspects of the embodiments of the present disclosure will become more apparent in combination with the drawings and with reference to the following specific embodiments. Throughout the drawings, the same or similar reference numerals represent the same or similar elements. It should

FIG. 4 is a schematic diagram of an algorithm routing table provided by the embodiments of the present disclosure;

DETAILED DESCRIPTION

Figure 1:
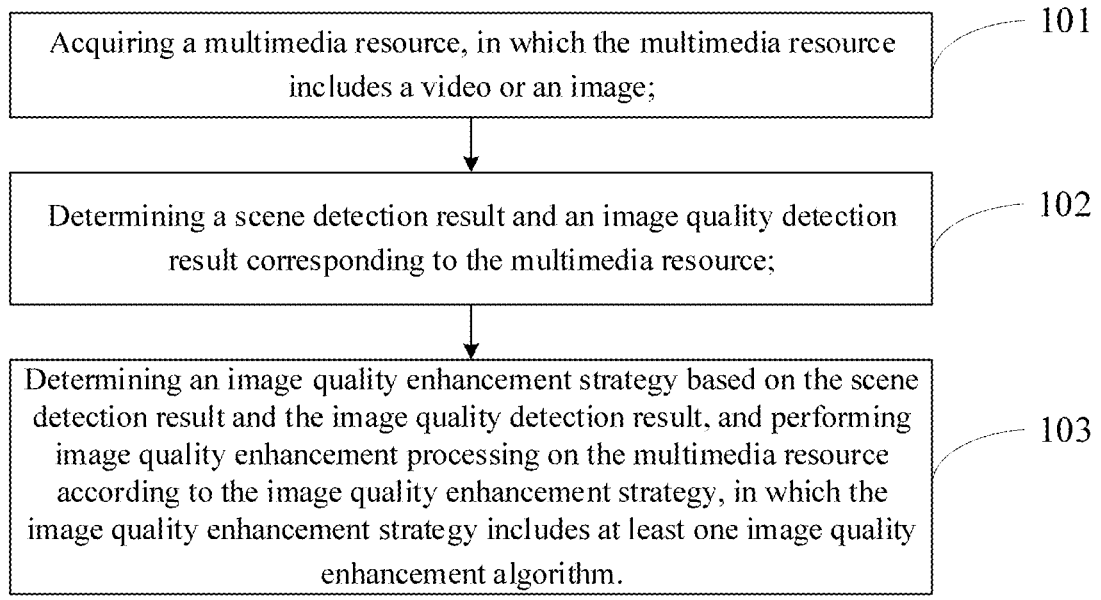
FIG. 1 is a schematic flowchart of an image quality adjustment method provided by the embodiments of the present disclosure.

Embodiments of the present disclosure will be described in more detail below with reference to the drawings. While certain embodiments of the present disclosure are shown in the drawings, it should be understood that the present disclosure may be embodied in various forms and should not be construed as limited to the embodiments set forth herein. Rather, these embodiments are provided for a thorough and complete understanding of the present disclosure. It should be understood that the drawings and embodiments of the present disclosure are only for exemplary purposes and are not intended to limit the protection scope of the present disclosure.

It should be understood that the various steps described in the method embodiments of the present disclosure may be performed in different orders and/or in parallel. Furthermore, the method embodiments may include additional steps and/or omit performing the illustrated steps. The protection scope of the present disclosure is not limited in this aspect.

As used herein, the term "include," "comprise," and variations thereof are open-ended inclusions, i.e., "including but not limited to." The term "based on" is "based, at least in part, on." The term "an embodiment" represents "at least one embodiment," the term "another embodiment" represents "at least one additional embodiment," and the term "some embodiments" represents "at least some embodiments." Relevant definitions of other terms will be given in the description below.

It should be noted that concepts such as the "first," "second," or the like mentioned in the present disclosure are only used to distinguish different devices, modules or units, and are not used to limit the interdependence relationship or the order of functions performed by these devices, modules or units.

It should be noted that the modifications of "a," "an," "a plurality of," or the like mentioned in the present disclosure are illustrative rather than restrictive, and those skilled in the art should understand that unless the context clearly indicates otherwise, these modifications should be understood as "one or more."

Names of messages or information exchanged between a plurality of apparatuses in the embodiments of the present disclosure are only used for illustrative purposes and are not intended to limit the scope of these messages or information.

Image quality enhancement is a function in an editing tool for images or videos, and usually provides a capability for adjustment in many sub-divided dimensions, such as saturation, contrast, definition, highlight, shadows, etc. However, it requires a particular amount of professional knowledge to understand meanings that these dimensions represent and to perform suitable parameter adjustment. This is not friendly for common users. In addition, complex parameter adjustment further dramatically increases the workload of editing and reduces the efficiency of a user in posting videos or images, which in turn affects the posting experience of the user.

In order to reduce the workload of parameter adjustment by the user while performing the image quality enhancement, some automatic image quality enhancement algorithms have appeared currently, such as a Contrast Limited Adaptive Histogram Equalization (CLAHE) algorithm, a sharpening algorithm (such as Unsharp Mask, USM), and the like. However, the current image quality enhancement algorithm is relatively simple, and is usually relatively simple automatic enhancement in a single dimension, such as contrast enhancement, sharpening, noise reduction, and the like, or several fixed automatic enhancement algorithms. However, in an actual scenario, there may be a plurality of different image quality problems. The above-mentioned manner is relatively simple and cannot obtain a good result, and the effect the image quality enhancement cannot meet requirements. To resolve the above-mentioned problems, the embodiments of the present disclosure provide an image quality adjustment method, and the following describes the method with reference to specific embodiments.

FIG. 1 is a schematic flowchart of an image quality adjustment method provided by the embodiments of the present disclosure. The method may be performed by an image quality adjustment apparatus. The apparatus may be implemented by software and/or hardware, and may be usually integrated in an electronic device. As shown in FIG. 1, the method includes the following steps.

Step 101: acquiring a multimedia resource, in which the multimedia resource includes a video or an image.

The multimedia resource may be any video or image on which image quality enhancement processing needs to be performed, and a specific file format and source are not limited. For example, the multimedia resource may be a video or an image obtained by real-time shooting, or a video or an image downloaded from the Internet.

Step 102: determining a scene detection result and an image quality detection result corresponding to the multimedia resource.

The scene detection result is used to indicate a semantic result of at least one dimension of the multimedia resource. The scene is one type of semantics, scene semantics to be expressed by the multimedia resources may include a described object, a scene category, and the like, and the scene detection result may be understood as a result obtained by detecting the scene semantics in one or more dimensions of the multimedia resource. In the embodiments of the present disclosure, the scene detection result may include at least one of a day and night result, a detection result of a target object, and an exposure degree, and the target object may be a human face.

The image quality detection result is used to indicate image quality of the multimedia resource. The image quality detection result is a result of performing detection of parameters related to a display effect on the multimedia resource, and the image quality detection result in the embodiments of the present disclosure may include a noise degree and/or a blurring degree, etc. Noise is unnecessary or redundant interference information that exists in the image or video.

In the embodiments of the present disclosure, after the multimedia resource is acquired, detection algorithms in a plurality of dimensions may be invoked to perform scene detection and image quality detection on the multimedia resource, so as to determine the corresponding scene detection result and image quality detection result. There may be a plurality of manners of determining the noise degree and the blurring degree in the image quality detection result, which is not limited in the embodiments of the present disclosure. For example, image quality detection is performed on the multimedia resource through a neural network-based noise recognition model. The blurring degree of the multimedia resource is recognized in a manner of determining a peak signal to noise ratio. The peak signal to noise ratio is inversely proportional to the blurring degree. That is, a higher peak signal to noise ratio indicates a lower blurring degree of the multimedia resource.

Optionally, determining the scene detection result corresponding to the multimedia resource may include: detecting the multimedia resource by using a deep learning model for day and night classification, to determine a day and night result corresponding to the multimedia resource, where the day and night result includes a day and a night; and/or determining a face detection result of the multimedia resource by using a face recognition algorithm.

The deep learning model for day and night classification may be a plurality of neural network-based classification models, for example, a Support Vector Machine (SVM) classifier, or a Convolutional Neural Network (CNN) used for performing day and night classification, which may be specifically determined based on an actual situation. Specifically, statistics may be collected on a brightness histogram of the multimedia resource, and classification is performed through the SVM classifier, or the resolution of the multimedia resource is adjusted, and then classification is performed through the convolutional neural network, and an obtained detection result is a day or a night.

The face recognition algorithm may be any algorithm that can perform face recognition. For example, the face recognition algorithm may be a convolutional neural network for face recognition. Specifically, a face region is extracted from the multimedia resource through the convolutional neural network for face recognition, or the face region may be extracted from the multimedia resource through extraction and matching of preset face feature points. An obtained face detection result may be that a face region is included or that a face region is not included.

Optionally, the exposure degree in the scene detection result corresponding to the multimedia resource may be determined with an Automatic Exposure Control (AEC) system. The exposure degree in the embodiments of the present disclosure may include underexposure, normal exposure, and overexposure.

Optionally, the face detection result and the exposure degree in the scene in the embodiments of the present disclosure may be used to correct the day and night result. For example, the multimedia resource is the day, but in the case where shooting is performed in a place with insufficient indoor light, the day and night result may be misjudged as the night. In this case, in the case where the face detection result is that a face region exists, and the exposure degree is normal exposure or overexposure, it may indicate that the day and night result is the day.

Step 103: determining an image quality enhancement strategy based on the scene detection result and the image quality detection result, and performing image quality enhancement processing on the multimedia resource according to the image quality enhancement strategy, in which the image quality enhancement strategy includes at least one image quality enhancement algorithm.

The image quality enhancement strategy may be a comprehensive solution (pipeline) used for performing image quality enhancement processing on the multimedia resource. The image quality enhancement strategy may include at least one image quality enhancement algorithm. The image quality enhancement algorithm may be an algorithm that can automatically detect the multimedia resource and perform targeted processing on some regions that need to be processed, and a deep learning algorithm is usually used. In the case where the image quality enhancement strategy includes a plurality of image quality enhancement algorithms, the plurality of image quality enhancement algorithms have an execution order, and the execution order may be determined based on an actual situation.

In the embodiments of the present disclosure, the image quality enhancement algorithm may include at least one of a noise reduction algorithm, a color brightness enhancement algorithm, a skin tone protection algorithm, and a sharpening algorithm. The color brightness enhancement algorithm may be implemented based on a deep neural network. The color brightness enhancement algorithm based on the deep neural network may train the convolutional neural network by constructing a color brightness enhancement dataset, and then perform color brightness enhancement on the multimedia resource by using the trained convolutional neural network. The skin tone protection algorithm means extracting a skin tone range for the face region of the multimedia resource, then performing skin tone detection and division in the face region, and performing feathering and blurring on a mask of a skin tone region.

Optionally, determining the image quality enhancement strategy based on the scene detection result and the image quality detection result may include: determining the corresponding image quality enhancement strategy by searching an algorithm routing table or using an algorithm branch decision tree, according to the scene detection result and the image quality detection result. The algorithm routing table is a routing table including a plurality of image quality enhancement strategies, and the algorithm branch decision tree is a decision tree including a plurality of branch judgment strategies.

The algorithm routing table may be a routing table including a plurality of image quality enhancement strategies in different cases, and each image quality enhancement strategy includes a combination of at least one image quality enhancement algorithm. The algorithm branch decision tree may be a decision tree including a plurality of branch judgment strategies, and the respective branch judgment strategies have an execution order.

Specifically, after the scene detection result and the image quality detection result corresponding to the multimedia resource are determined, the algorithm routing table may be searched according to the scene detection result and the image quality detection result, to determine the image quality enhancement strategy including the combination of at least one image quality enhancement algorithm; or the scene detection result and the image quality detection result may be input into the algorithm branch decision tree, and branch judgment is performed one by one based on a preset execution order of the plurality of branch judgment strategies. An image quality enhancement algorithm corresponding to a current branch judgment result may be determined after each branch judgment strategy. Finally, after judgment ends, the image quality enhancement strategy including the combination of at least one image quality enhancement algorithm may be obtained. Then, image quality enhancement processing may be performed on the multimedia resource using the image quality enhancement strategy, to obtain an enhanced multimedia resource.

Optionally, the image quality enhancement algorithm of the multimedia resource may alternatively be determined according to description (meta) information of the multimedia resource. The description information may be attribute information included in the multimedia resource. For example, in the case where the multimedia resource is a video, the description information may be a video title, a video summary, or the like. A keyword may be extracted according to the description information of the multimedia resource, and a corresponding image quality enhancement algorithm is determined according to the keyword and a pre-established mapping relationship between keywords and image quality enhancement algorithms.

Optionally, after the image quality enhancement strategy including the at least one image quality enhancement algorithm is determined, an execution graph including algorithm nodes may be used for description, and chain-typed serial processing, branched parallel processing, and a combination of the above-mentioned two processing manners may be performed on the algorithm nodes therein. Details are not limited.

The image quality adjustment method provided by the embodiments of the present disclosure includes: acquiring a multimedia resource, in which the multimedia resource includes a video or an image; determining a scene detection result and an image quality detection result corresponding to the multimedia resource; and determining an image quality enhancement strategy based on the scene detection result and the image quality detection result, and performing image quality enhancement processing on the multimedia resource according to the image quality enhancement strategy, in which the image quality enhancement strategy includes at least one image quality enhancement algorithm. With the above technical solution, the corresponding image quality enhancement strategy can be determined based on the scene and image quality of the video or image, and the image quality enhancement strategy is used to enhance the image quality effect. Because the image quality enhancement strategy is determined based on information in two dimensions of the scene and the image quality, and can be combined with one or more image quality enhancement algorithms, adaptive and targeted image quality enhancement can be achieved, which significantly improves the effect of image quality enhancement, thereby greatly improving the user experience.

In some embodiments, in the case where the multimedia resource is a video, determining the scene detection result and the image quality detection result corresponding to the multimedia resource may includes: extracting a plurality of key frames from the multimedia resource; and determining the scene detection result and the image quality detection result corresponding to the multimedia resource by detecting the plurality of key frames.

A key frame may be one of a plurality of video frames included in a video. The key frame can represent a video clip, and a video frame may be a minimum unit that forms the video. In the case where the multimedia resource is a video, a plurality of key frames may be first extracted from the video, and scene detection and image quality detection are performed on the plurality of key frames respectively, so that scene detection and image quality detection of the multimedia resource can be achieved, to obtain the scene detection result and the image quality detection result.

Optionally, extracting the plurality of key frames from the multimedia resource may include: dividing the multimedia resource into a plurality of video clips, in which a similarity between two adjacent video clips is less than a preset threshold; and extracting a plurality of key frames from each video clip. The key frame may be used to represent a video clip. The key frame may be obtained by performing uniform extraction on a video clip. A specific quantity may be determined based on an actual situation.

Specifically, in the case where the multimedia resource is a video, the video may be first divided, through transition detection, into a plurality of video clips that have continuous scenes. During the transition detection process, similarities between two adjacent frames of the video may be sequentially determined, and when the similarity is less than a preset threshold, it indicates that scenes of the current two adjacent frames change, and a middle time point between the current two adjacent frames may be used as a boundary to divide the video. Two video clips obtained through division respectively include the current two adjacent frames. Therefore, the similarity between the two video clips is also less than the preset threshold. The preset threshold may be determined based on an actual situation. After the video is divided into the plurality of video clips, a plurality of key frames may be extracted from each video clip.

Optionally, determining the scene detection result and the image quality detection result corresponding to the multimedia resource by detecting the plurality of key frames may include: determining a clip scene detection result and a clip image quality detection result corresponding to each video clip through scene detection and image quality detection of the plurality of key frames included in each video clip.

After the plurality of key frames of each video clip are extracted, the key frames may be used as inputs of subsequent scene and image quality detection. When determining the scene detection result and the image quality detection result of the multimedia resource, processing may be performed in the unit of a video clip. To be specific, a clip scene detection result and a clip image quality detection result corresponding to each video clip are determined through scene detection and image quality detection of the plurality of key frames included in each video clip. A specific determining manner is similar to that in the above-mentioned embodiment. Details are not described herein.

Because there are a plurality of key frames in each video clip, information aggregation may be performed on clip scene detection results and clip image quality detection results corresponding to the plurality of key frames, to determine the scene and image quality of each video clip. Taking the case where a detection result in one dimension in a clip scene detection result and a clip image quality detection result of one video clip as an example, a specific process of information aggregation may include: performing quantity statistics collection on detection results in a target dimension of the plurality of key frames, to determine a quantity of key frames corresponding to each detection result; and determining a detection result in which the quantity of key frames is greater than or equal to a preset quantity as a finally determined detection result in the target dimension, where the preset quantity may be greater than or equal to a half of the quantity of key frames; and if the quantity of key frames corresponding to each detection result is identical, determining a confidence of each detection result, and determining a detection result with a highest confidence as the finally determined detection result in the target dimension. For the above-mentioned result aggregation, the final detection result may be first determined through voting based on a classification result, and if the final detection result cannot be determined, the final detection result may continue to be determined based on a numerical result.

In some embodiments, performing image quality enhancement processing on the multimedia resource includes: performing image quality enhancement processing on each video clip in the multimedia resource respectively, according to a clip image quality enhancement algorithm determined based on the clip scene detection result and the clip image quality detection result corresponding to each video clip.

After the clip scene detection result and the clip image quality detection result of each video clip are determined for the multimedia resource divided into the plurality of video clips, image quality enhancement processing may be performed in the unit of a video clip. To be specific, a corresponding clip image quality enhancement algorithm is determined according to the clip scene detection result and the clip image quality detection result corresponding to each video clip by searching an algorithm routing table or using an algorithm branch decision tree, and the clip image quality enhancement algorithm is used to perform image quality enhancement processing on each video clip, to obtain each enhanced video clip.

In the above-mentioned solution, not only image quality enhancement can be implemented on the video, but also video clips in different scenes in the video can be respectively enhanced in corresponding image quality enhancement manners, so that the image quality enhancement effect of the video is more accurate and more targeted, thereby diversifying image quality effect of the enhanced video.

Figure 2:
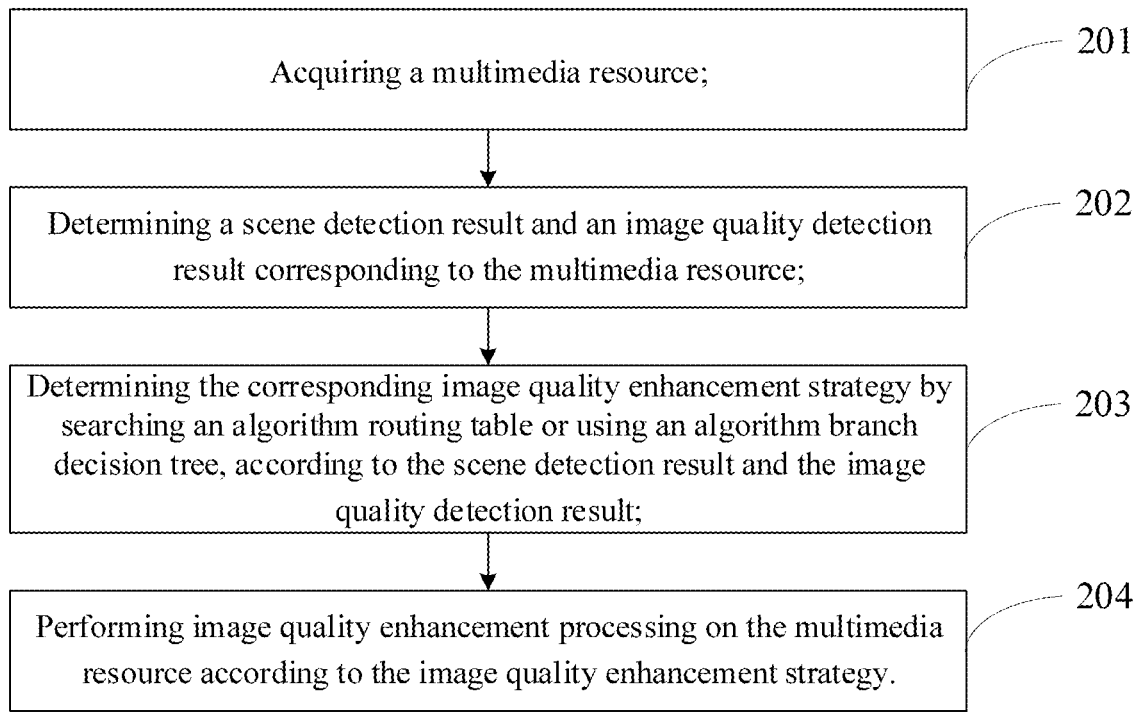
FIG. 2 is a schematic flowchart of another image quality adjustment method provided by the embodiments of the present disclosure.

FIG. 2 is a schematic flowchart of another image quality adjustment method provided by the embodiments of the present disclosure. In this embodiment, the above-mentioned image quality adjustment method is further optimized based on the above-mentioned embodiment. As shown in FIG. 2, the method includes the following steps.

Step 201: acquiring a multimedia resource.

The multimedia resource includes a video or an image.

Step 202: determining a scene detection result and an image quality detection result corresponding to the multimedia resource.

The scene detection result includes at least one of a day and night result, a detection result of a target object, and an exposure degree, and the image quality detection result includes a noise degree and/or a blurring degree.

Optionally, determining the scene detection result corresponding to the multimedia resource includes: detecting the multimedia resource by using a deep learning model for day and night classification, to determine a day and night result corresponding to the multimedia resource, where the day and night result includes a day and a night; and/or determining a face detection result of the multimedia resource by using a face recognition algorithm.

Step 203: determining the corresponding image quality enhancement strategy by searching an algorithm routing table or using an algorithm branch decision tree, according to the scene detection result and the image quality detection result.

The image quality enhancement strategy includes at least one image quality enhancement algorithm. Optionally, the image quality enhancement algorithm includes at least one of a noise reduction algorithm, a color brightness enhancement algorithm, a skin tone protection algorithm, and a sharpening algorithm. The algorithm routing table is a routing table including a plurality of image quality enhancement strategies, and the algorithm branch decision tree is a decision tree including a plurality of branch judgment strategies.

Optionally, the algorithm routing table is a routing table including a plurality of image quality enhancement strategies, and the algorithm branch decision tree is a decision tree including a plurality of branch judgment strategies.

Optionally, in the case where the multimedia resource is a video, determining the scene detection result and the image quality detection result corresponding to the multimedia resource includes: extracting a plurality of key frames from the multimedia resource; and determining the scene detection result and the image quality detection result corresponding to the multimedia resource by detecting the plurality of key frames.

Optionally, extracting the plurality of key frames from the multimedia resource may include: dividing the multimedia resource into a plurality of video clips, in which a similarity between two adjacent video clips is less than a preset threshold; and extracting a plurality of key frames from each video clip. Optionally, determining the scene detection result and the image quality detection result corresponding to the multimedia resource by detecting the plurality of key frames includes: determining a clip scene detection result and a clip image quality detection result corresponding to each video clip through scene detection and image quality detection of the plurality of key frames included in each video clip.

Step 204: performing image quality enhancement processing on the multimedia resource according to the image quality enhancement strategy.

Optionally, in the case where the multimedia resource is a video, performing image quality enhancement processing on the multimedia resource includes: performing image quality enhancement processing on each video clip in the multimedia resource respectively, according to a clip image quality enhancement algorithm determined based on the clip scene detection result and the clip image quality detection result corresponding to each video clip.

Figure 3:
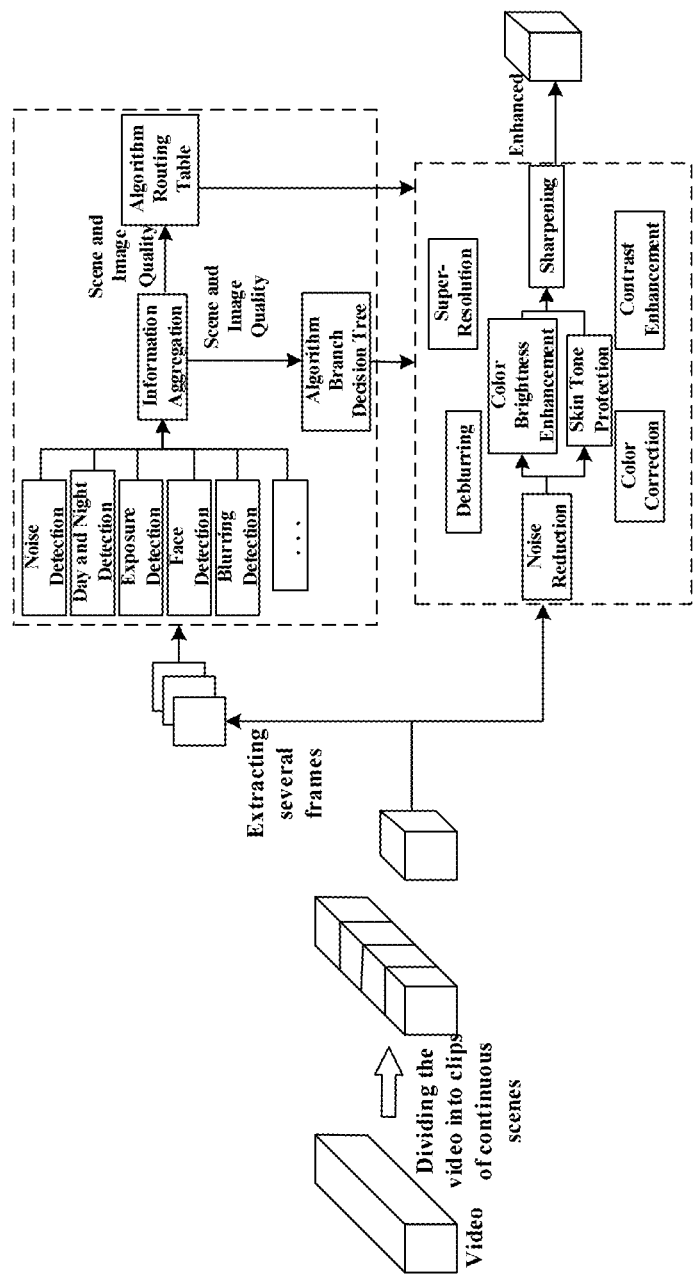
FIG. 3 is a schematic diagram of an image quality adjustment process provided by the embodiments of the present disclosure.

For example, FIG. 3 is a schematic diagram of an image quality adjustment process provided by the embodiments of the present disclosure. In FIG. 3, an example in which the multimedia resource is a video is used to indicate the image quality adjustment process provided by the embodiments of the present disclosure. As shown in FIG. 3, a specific process may include the following steps. 1. First dividing the video into clips of continuous scenes through transition detection. As shown in the figure, a complete video is divided into a plurality of video clips. 2. For each video clip, extracting several frames as inputs of scene and image quality detection. 3. Invoking a detection algorithm to respectively perform scene and image quality detection on the extracted frames, where a detection dimension includes but is not limited to day and night detection, noise detection, exposure detection, face detection, and blurring detection in the figure, a day and night result, an exposure degree, and a face detection result are scene detection results, and a noise degree and a blurring degree are image quality detection results. 4. Aggregating scene and image quality detection results of the plurality of frames, to obtain the scene and image quality of each video clip. 5. An image quality enhancement solution (pipeline) corresponding to the video may be generated according to the scene and the image quality of each video clip and description (meta) information that is carried in the video, where the image quality enhancement solution includes a combination of a plurality of processing algorithms that have an execution order. 6. Specific manners may include: a, an algorithm routing table that sequentially uses the scene, the image quality, and the description information as condition entries; and b, an algorithm branch decision tree that uses the scene, the image quality, and the description information as condition entries. 7. The image quality enhancement solution may be described with a graph formed by algorithm nodes, and the algorithms allow chain-typed serial processing, branched parallel processing, and a combination of the above-mentioned two processing solutions. The image quality enhancement solution determined in FIG. 3 may include four algorithms: noise reduction, color brightness enhancement, skin tone protection, and sharpening. The arrow represents an execution order, and color brightness enhancement and skin tone protection may be processed in parallel. 8. Perform image quality enhancement processing on each video clip according to an image quality enhancement solution corresponding to each video clip, to obtain an enhanced video clip.

For example, FIG. 4 is a schematic diagram of an algorithm routing table provided by the embodiments of the present disclosure. FIG. 4 shows an exemplary algorithm routing table. The algorithm routing table may be pre-established and stored. During actual use, after the scene and the image quality are determined, a corresponding image quality enhancement strategy may be determined through searching the algorithm routing table. As shown in the figure, the scene and the image quality in the first column are respectively: night scene (that is, night), underexposure, a range of a noise degree is [a, b], a human face is detected, and no blur, and the corresponding image quality enhancement strategy may include four image quality enhancement algorithms in the figure: noise reduction, color brightness enhancement, skin tone protection, and sharpening. The execution order is shown in FIG. 4. In the figure, different algorithms may be represented by circles with different attributes, for example, may be represented by circles with different grayscales or different padding colors.

In the above-mentioned solution, when the multimedia resource is a video, the video is divided into continuous clips, and scene detection and image quality detection are performed on each of the continuous scene clips, to obtain scene and image quality information of the video clip. Then, the image quality enhancement solution including the combination of a plurality of algorithms is generated in manners such as the routing table or the decision tree, and each video clip is enhanced.

In this solution, for a video or an image with unknown scene and image quality, an enhancement solution based on the scene and image quality is proposed. The video or image is detected to analyze existing image quality problems, and then a suitable comprehensive solution and suitable algorithm parameters are automatically selected. Self-adaptive and targeted image quality enhancement is implemented through automatic combination of a variety of different algorithms, to avoid the problem of low accuracy caused by a failure of a single enhancement algorithm or a fixed algorithmic procedure to adapt to all scenarios, so as to significantly improve the effect of image quality enhancement and significantly reduce workload of editing by users.

The image quality adjustment method provided by the embodiments of the present disclosure includes: acquiring a multimedia resource, in which the multimedia resource includes a video or an image; determining a scene detection result and an image quality detection result corresponding to the multimedia resource; determining the corresponding image quality enhancement strategy by searching an algorithm routing table or using an algorithm branch decision tree, according to the scene detection result and the image quality detection result; and performing image quality enhancement processing on the multimedia resource according to the image quality enhancement strategy. With the above technical solution, the corresponding image quality enhancement strategy can be determined based on the scene and image quality of the video or image, and the image quality enhancement strategy is used to enhance the image quality effect. Because the image quality enhancement strategy is determined based on information in two dimensions of the scene and the image quality, and can be combined with one or more image quality enhancement algorithms, adaptive and targeted image quality enhancement can be achieved, which significantly improves the effect of image quality enhancement, thereby greatly improving the user experience.

Figure 5:
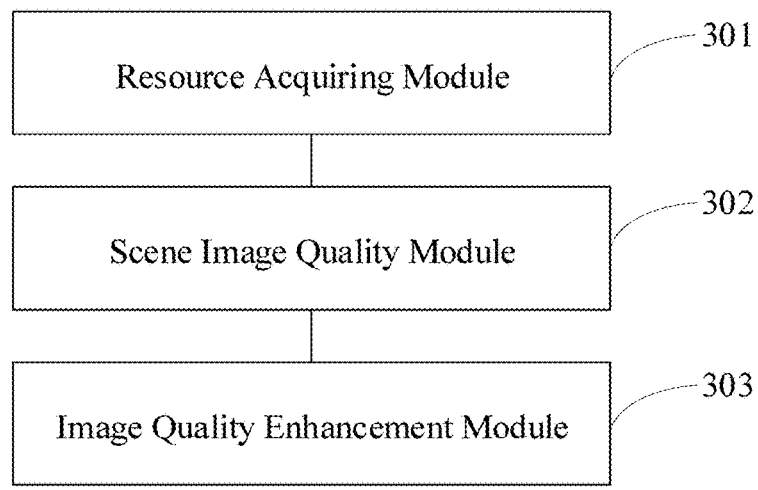
FIG. 5 is a schematic diagram of a structure of an image quality adjustment apparatus provided by the embodiments of the present disclosure.

FIG. 5 is a schematic diagram of a structure of an image quality adjustment apparatus provided by the embodiments of the present disclosure. The apparatus may be implemented by software and/or hardware, and may be usually integrated in an electronic device. As shown in FIG. 5, the apparatus includes:

a resource acquiring module 301, configured to acquire a multimedia resource, in which the multimedia resource includes a video or an image;

a scene image quality module 302, configured to determine a scene detection result and an image quality detection result corresponding to the multimedia resource, in which the scene detection result is used to indicate a semantic result of at least one dimension of the multimedia resource, and the image quality detection result is used to indicate image quality of the multimedia resource;

and an image quality enhancement module 303, configured to determine an image quality enhancement strategy based on the scene detection result and the image quality detection result, and perform image quality enhancement processing on the multimedia resource according to the image quality enhancement strategy, in which the image quality enhancement strategy includes at least one image quality enhancement algorithm.

Optionally, the scene detection result includes at least one of a day and night result, a detection result of a target object, and an exposure degree, and the image quality detection result includes a noise degree and/or a blurring degree.

Optionally, the scene image quality module 302 is specifically configured to:

determine the corresponding image quality enhancement strategy by searching an algorithm routing table or using an algorithm branch decision tree, according to the scene detection result and the image quality detection result.

Optionally, the algorithm routing table is a routing table including a plurality of image quality enhancement strategies, and the algorithm branch decision tree is a decision tree including a plurality of branch judgment strategies.

Optionally, in the case where the image quality enhancement strategy includes a plurality of image quality enhancement algorithms, the plurality of image quality enhancement algorithms have an execution order.

Optionally, in the case where the multimedia resource is a video, the scene image quality module 302 includes:

a frame extraction unit, configured to extract a plurality of key frames from the multimedia resource;

and a detection unit, configured to determine the scene detection result and the image quality detection result corresponding to the multimedia resource by detecting the plurality of key frames.

Optionally, the frame extraction unit is specifically configured to:

divide the multimedia resource into a plurality of video clips, in which a similarity between two adjacent video clips is less than a preset threshold;

and extract a plurality of key frames from each video clip.

Optionally, the detection unit is configured to:

determine a clip scene detection result and a clip image quality detection result corresponding to each video clip through scene detection and image quality detection of the plurality of key frames included in each video clip.

Optionally, the image quality enhancement module 303 is specifically configured to:

perform image quality enhancement processing on each video clip in the multimedia resource respectively, according to a clip image quality enhancement algorithm determined based on the clip scene detection result and the clip image quality detection result corresponding to each video clip.

Optionally, the image quality enhancement algorithm includes at least one of a noise reduction algorithm, a color brightness enhancement algorithm, a skin tone protection algorithm, and a sharpening algorithm.

The image quality adjustment apparatus provided by the embodiments of the present disclosure can perform the image quality adjustment method provided by any embodiment of the present disclosure, and has corresponding functional modules for performing the method and beneficial effects.

The embodiments of the present disclosure further provide a computer program product, including a computer program/instruction, and when the computer program/instruction is executed by a processor, the image quality adjustment method provided by any embodiment of the present disclosure is implemented.

When software is used to implement the method, the method may be entirely or partially implemented in a form of a computer program product. The computer program product includes one or more computer instructions. When the computer program instructions are loaded and executed on a computer, the procedures or functions according to the embodiments of the present disclosure are entirely or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, wireless, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state disk (SSD)), or the like.

Figure 6:
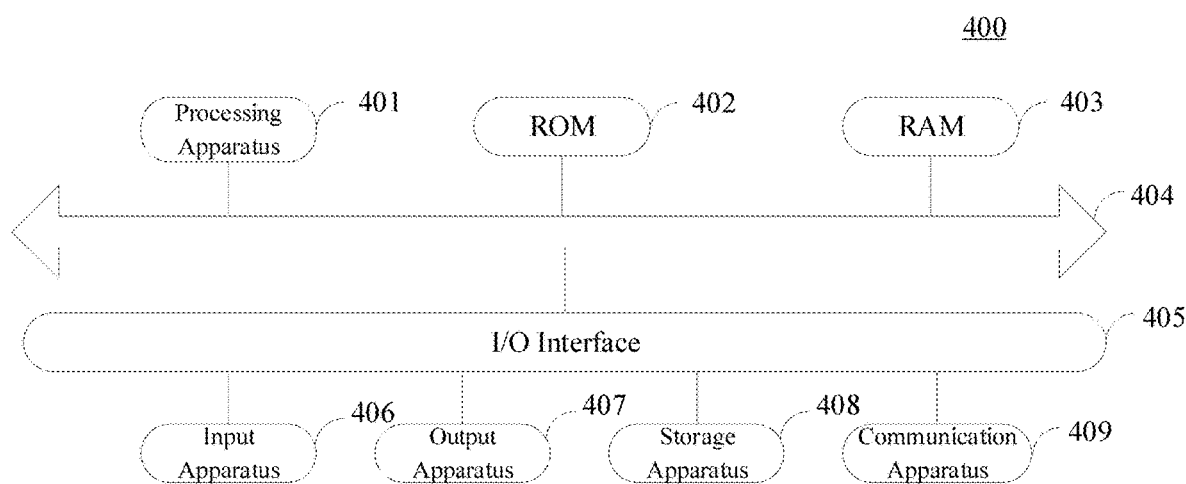
FIG. 6 is a schematic diagram of a structure of an electronic device provided by the embodiments of the present disclosure.

FIG. 6 is a schematic diagram of a structure of an electronic device provided by the embodiments of the present disclosure. The following specifically shows a schematic diagram of a structure of an electronic device 400 provided by the embodiments of the present disclosure with reference to FIG. 6. The electronic device 400 in the embodiments of the present disclosure may include, but not limited to, a mobile terminal such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), or the like, and fixed terminals such as a digital TV, a desktop computer, or the like. The electronic device illustrated in FIG. 6 is merely an example, and should not pose any limitation to the functions and the range of use of the embodiments of the present disclosure.

As shown in FIG. 6, the electronic device 400 may include a processing apparatus 401 (e.g., a central processing unit, a graphics processing unit, etc.), which can perform various suitable actions and processing according to a program stored in a read-only memory (ROM) 402 or a program loaded from a storage apparatus 408 into a random-access memory (RAM) 403. The RAM 403 further stores various programs and data required for operations of the electronic device 400. The processing apparatus 401, the ROM 402, and the RAM 403 are interconnected by means of a bus 404. An input/output (I/O) interface 405 is also connected to the bus 404.

Usually, the following apparatus may be connected to the I/O interface 405: an input apparatus 406 including, for example, a touch screen, a touch pad, a keyboard, a mouse, a camera, a microphone, an accelerometer, a gyroscope, or the like; an output apparatus 407 including, for example, a liquid crystal display (LCD), a loudspeaker, a vibrator, or the like; a storage apparatus 408 including, for example, a magnetic tape, a hard disk, or the like; and a communication apparatus 409. The communication apparatus 409 may allow the electronic device 400 to be in wireless or wired communication with other devices to exchange data. While FIG. 6 illustrates the electronic device 400 having various apparatuses, it should be understood that not all of the illustrated apparatuses are necessarily implemented or included. More or fewer apparatuses may be implemented or included alternatively.

Particularly, according to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 409 and installed, or may be installed from the storage apparatus 408, or may be installed from the ROM 402. When the computer program is executed by the processing apparatus 401, the above-mentioned functions defined in the image quality adjustment methods of the embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: acquire a multimedia resource, in which the multimedia resource includes a video or an image; determine a scene detection result and an image quality detection result corresponding to the multimedia resource, in which the scene detection result is used to indicate a semantic result of at least one dimension of the multimedia resource, and the image quality detection result is used to indicate image quality of the multimedia resource; and determine an image quality enhancement strategy based on the scene detection result and the image quality detection result, and perform image quality enhancement processing on the multimedia resource according to the image quality enhancement strategy, in which the image quality enhancement strategy includes at least one image quality enhancement algorithm.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus, or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, the present disclosure provides an image quality adjustment method, including:

acquiring a multimedia resource, in which the multimedia resource comprises a video or an image;

determining a scene detection result and an image quality detection result corresponding to the multimedia resource, in which the scene detection result is used to indicate a semantic result of at least one dimension of the multimedia resource, and the image quality detection result is used to indicate image quality of the multimedia resource;

and determining an image quality enhancement strategy based on the scene detection result and the image quality detection result, and performing image quality enhancement processing on the multimedia resource according to the image quality enhancement strategy, in which the image quality enhancement strategy includes at least one image quality enhancement algorithm.

According to one or more embodiments of the present disclosure, in the image quality adjustment method provided by the present disclosure, the scene detection result includes at least one of a day and night result, a detection result of a target object, and an exposure degree, and the image quality detection result includes a noise degree and/or a blurring degree.

According to one or more embodiments of the present disclosure, in the image quality adjustment method provided by the present disclosure, the determining an image quality enhancement strategy based on the scene detection result and the image quality detection result includes:

determining the corresponding image quality enhancement strategy by searching an algorithm routing table or using an algorithm branch decision tree, according to the scene detection result and the image quality detection result.

According to one or more embodiments of the present disclosure, in the image quality adjustment method provided by the present disclosure, the algorithm routing table is a routing table including a plurality of image quality enhancement strategies, and the algorithm branch decision tree is a decision tree including a plurality of branch judgment strategies.

According to one or more embodiments of the present disclosure, in the image quality adjustment method provided by the present disclosure, in the case where the image quality enhancement strategy includes a plurality of image quality enhancement algorithms, the plurality of image quality enhancement algorithms have an execution order.

According to one or more embodiments of the present disclosure, in the case where the multimedia resource is a video, determining a scene detection result and an image quality detection result corresponding to the multimedia resource includes:

extracting a plurality of key frames from the multimedia resource;

and determining the scene detection result and the image quality detection result corresponding to the multimedia resource by detecting the plurality of key frames.

According to one or more embodiments of the present disclosure, in the image quality adjustment method provided by the present disclosure, extracting a plurality of key frames from the multimedia resource includes:

dividing the multimedia resource into a plurality of video clips, in which a similarity between two adjacent video clips is less than a preset threshold;

and extracting a plurality of key frames from each video clip.

According to one or more embodiments of the present disclosure, in the image quality adjustment method provided by the present disclosure, determining the scene detection result and the image quality detection result corresponding to the multimedia resource by detecting the plurality of key frames includes:

determining a clip scene detection result and a clip image quality detection result corresponding to each video clip through scene detection and image quality detection of the plurality of key frames included in each video clip.

According to one or more embodiments of the present disclosure, in the image quality adjustment method provided by the present disclosure, performing image quality enhancement processing on the multimedia resource includes:

performing image quality enhancement processing on each video clip in the multimedia resource respectively, according to a clip image quality enhancement algorithm determined based on the clip scene detection result and the clip image quality detection result corresponding to each video clip.

According to one or more embodiments of the present disclosure, in the image quality adjustment method provided by the present disclosure, the image quality enhancement algorithm includes at least one of a noise reduction algorithm, a color brightness enhancement algorithm, a skin tone protection algorithm, and a sharpening algorithm.

According to one or more embodiments of the present disclosure, the present disclosure provides an image quality adjustment apparatus, including:

a resource acquiring module, configured to acquire a multimedia resource, in which the multimedia resource includes a video or an image;

a scene image quality module, configured to determine a scene detection result and an image quality detection result corresponding to the multimedia resource, in which the scene detection result is used to indicate semantic result of at least one dimension of the multimedia resource, and the image quality detection result is used to indicate image quality of the multimedia resource;

and an image quality enhancement module, configured to determine an image quality enhancement strategy based on the scene detection result and the image quality detection result, and perform image quality enhancement processing on the multimedia resource according to the image quality enhancement strategy, in which the image quality enhancement strategy includes at least one image quality enhancement algorithm.

According to one or more embodiments of the present disclosure, in the image quality adjustment apparatus provided by the present disclosure, the scene detection result includes at least one of a day and night result, a detection result of a target object, and an exposure degree, and the image quality detection result includes a noise degree and/or a blurring degree.

According to one or more embodiments of the present disclosure, in the image quality adjustment apparatus provided by the present disclosure, the scene image quality module is specifically configured to:

determine the corresponding image quality enhancement strategy by searching an algorithm routing table or using an algorithm branch decision tree, according to the scene detection result and the image quality detection result.

According to one or more embodiments of the present disclosure, in the image quality adjustment apparatus provided by the present disclosure, the algorithm routing table is a routing table including a plurality of image quality enhancement strategies, and the algorithm branch decision tree is a decision tree including a plurality of branch judgment strategies.

According to one or more embodiments of the present disclosure, in the image quality adjustment apparatus provided by the present disclosure, in the case where the image quality enhancement strategy includes a plurality of image quality enhancement algorithms, the plurality of image quality enhancement algorithms have an execution order.

According to one or more embodiments of the present disclosure, in the image quality adjustment apparatus provided by the present disclosure, in the case where the multimedia resource is a video, the scene image quality module includes:
 a frame extraction unit, configured to extract a plurality of key frames from the multimedia resource; and
 a detection unit, configured to determine the scene detection result and the image quality detection result corresponding to the multimedia resource by detecting the plurality of key frames.

According to one or more embodiments of the present disclosure, in the image quality adjustment apparatus provided by the present disclosure, the frame extraction unit is specifically configured to:
 divide the multimedia resource into a plurality of video clips, in which a similarity between two adjacent video clips is less than a preset threshold;
 and extract a plurality of key frames from each video clip.

According to one or more embodiments of the present disclosure, in the image quality adjustment apparatus provided by the present disclosure, the detection unit is configured to:
 determine a clip scene detection result and a clip image quality detection result corresponding to each video clip through scene detection and image quality detection of the plurality of key frames included in each video clip.

According to one or more embodiments of the present disclosure, in the image quality adjustment apparatus provided by the present disclosure, the image quality enhancement module is specifically configured to:
 perform image quality enhancement processing on each video clip in the multimedia resource respectively, according to a clip image quality enhancement algorithm determined based on the clip scene detection result and the clip image quality detection result corresponding to each video clip.

According to one or more embodiments of the present disclosure, in the image quality adjustment apparatus provided by the present disclosure, the image quality enhancement algorithm includes at least one of a noise reduction algorithm, a color brightness enhancement algorithm, a skin tone protection algorithm, and a sharpening algorithm.

According to one or more embodiments of the present disclosure, the present disclosure provides an electronic device, including:
 a processor;
 and a memory, configured to store instructions that can be executed by the processor;
 and the processor is configured to read the instructions from the memory, and execute the instructions to implement any image quality adjustment method provided by the present disclosure.

According to one or more embodiments of the present disclosure, the present disclosure provides a computer-readable storage medium, the storage medium stores a computer program, and the computer program is used to perform any image quality adjustment method provided by the present disclosure.

According to one or more embodiments of the present disclosure, the present disclosure provides a computer program product, including a computer program/instruction, and when the computer program/instruction is executed by a processor, any image quality adjustment method provided by the present disclosure is implemented.

The above descriptions are merely preferred embodiments of the present disclosure and illustrations of the technical principles employed. Those skilled in the art should understand that the scope of disclosure involved in the present disclosure is not limited to the technical solutions formed by the specific combination of the above-mentioned technical features, and should also cover, without departing from the above-mentioned disclosed concept, other technical solutions formed by any combination of the above-mentioned technical features or their equivalents, such as technical solutions which are formed by replacing the above-mentioned technical features with the technical features disclosed in the present disclosure (but not limited to) with similar functions.

Additionally, although operations are depicted in a particular order, it should not be understood that these operations are required to be performed in a specific order as illustrated or in a sequential order. Under certain circumstances, multitasking and parallel processing may be advantageous. Likewise, although the above discussion includes several specific implementation details, these should not be interpreted as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combinations.

Although the subject matter has been described in language specific to structural features and/or method logical actions, it should be understood that the subject matter defined in the appended claims is not necessarily limited to the specific features or actions described above. Rather, the specific features and actions described above are merely example forms of implementing the claims.

The invention claimed is:

1. An image quality adjustment method, comprising:
 acquiring a multimedia resource, wherein the multimedia resource comprises a video or an image;
 determining a scene detection result and an image quality detection result corresponding to the multimedia resource, wherein the scene detection result is used to indicate a semantic result of at least one dimension of the multimedia resource, and the image quality detection result is used to indicate image quality of the multimedia resource; and
 determining an image quality enhancement strategy based on the scene detection result and the image quality detection result, and performing image quality enhancement processing on the multimedia resource according to the image quality enhancement strategy, wherein the image quality enhancement strategy comprises at least one image quality enhancement algorithm;

wherein in a case where the image quality enhancement strategy comprises a plurality of image quality enhancement algorithms, the plurality of image quality enhancement algorithms have an execution order;

wherein in a case where the multimedia resource is a video, determining the scene detection result and the image quality detection result corresponding to the multimedia resource comprises:
  extracting a plurality of key frames from the multimedia resource; and
  determining the scene detection result and the image quality detection result corresponding to the multimedia resource by detecting the plurality of key frames;

wherein extracting the plurality of key frames from the multimedia resource comprises:
  dividing the multimedia resource into a plurality of video clips, wherein a similarity between two adjacent video clips is less than a preset threshold; and
  extracting a plurality of key frames from each video clip among the plurality of video clips;

wherein determining the image quality enhancement strategy based on the scene detection result and the image quality detection result comprises:
determining the corresponding image quality enhancement strategy by using an algorithm branch decision tree, according to the scene detection result and the image quality detection result, wherein the algorithm branch decision tree is a decision tree comprising a plurality of branch judgment strategies, wherein determining the corresponding image quality enhancement strategy by using the algorithm branch decision tree comprises:
inputting the scene detection result and the image quality detection result into the algorithm branch decision tree, performing branch judgment one by one based on a preset execution order of the plurality of branch judgment strategies, determining the image quality enhancement algorithm corresponding to a current branch judgment result after each branch judgment strategy, and obtaining the image quality enhancement strategy comprising a combination of at least one image quality enhancement algorithm after judgment ends.

2. The method according to claim 1, wherein the scene detection result comprises at least one of a day and night result, a detection result of a target object, and an exposure degree, and the image quality detection result comprises a noise degree and/or a blurring degree.

3. The method according to claim 1, wherein determining the scene detection result and the image quality detection result corresponding to the multimedia resource by detecting the plurality of key frames comprises:
  determining a clip scene detection result and a clip image quality detection result corresponding to the each video clip through scene detection and image quality detection of the plurality of key frames comprised in the each video clip.

4. The method according to claim 3, wherein performing image quality enhancement processing on the multimedia resource comprises:
  performing image quality enhancement processing on the each video clip in the multimedia resource respectively, according to a clip image quality enhancement algorithm determined based on the clip scene detection result and the clip image quality detection result corresponding to the each video clip.

5. The method according to claim 1, wherein the image quality enhancement algorithm comprises at least one of a noise reduction algorithm, a color brightness enhancement algorithm, a skin tone protection algorithm, and a sharpening algorithm.

6. An electronic device, comprising:
  a processor; and
  a memory, configured to store instructions that can be executed by the processor,
  wherein the processor is configured to read the instructions from the memory, and execute the instructions to implement the image quality adjustment method according to claim 1.

7. A non-transitory computer-readable storage medium, storing a computer program, wherein the computer program is used to perform the image quality adjustment method according to claim 1.

8. An image quality adjustment apparatus, comprising:
  a resource acquiring module, configured to acquire a multimedia resource, wherein the multimedia resource comprises a video or an image;
  a scene image quality module, configured to determine a scene detection result and an image quality detection result corresponding to the multimedia resource, wherein the scene detection result is used to indicate a semantic result of at least one dimension of the multimedia resource, and the image quality detection result is used to indicate image quality of the multimedia resource; and
  an image quality enhancement module, configured to determine an image quality enhancement strategy based on the scene detection result and the image quality detection result, and perform image quality enhancement processing on the multimedia resource according to the image quality enhancement strategy, wherein the image quality enhancement strategy comprises at least one image quality enhancement algorithm;

wherein in a case where the image quality enhancement strategy comprises a plurality of image quality enhancement algorithms, the plurality of image quality enhancement algorithms have an execution order;

wherein in a case where the multimedia resource is a video, the scene image quality module further comprises:
a frame extraction unit, configured to extract a plurality of key frames from the multimedia resource; and
a detection unit, configured to determine the scene detection result and the image quality detection result corresponding to the multimedia resource by detecting the plurality of key frames;

wherein the frame extraction unit is further configured to:
divide the multimedia resource into a plurality of video clips, wherein a similarity between two adjacent video clips is less than a preset threshold; and
extract a plurality of key frames from each video clip among the plurality of video clips;

wherein the scene image quality module is further configured to determine the corresponding image quality enhancement strategy by using an algorithm branch decision tree, according to the scene detection result and the image quality detection result, wherein the algorithm branch decision tree is a decision tree comprising a plurality of branch judgment strategies, wherein the scene image quality module is further configured to input the scene detection result and the image quality detection result into the algorithm branch decision tree, perform branch judgment one by one based on a preset execution order of the plurality of branch judgment strategies, determine the image quality enhancement algorithm corresponding to a current branch judgment result after each branch judgment strategy, and obtain the image quality enhancement strategy comprising a combination of at least one image quality enhancement algorithm after judgment ends.

9. The image quality adjustment apparatus according to claim 8, wherein the scene detection result comprises at least one of a day and night result, a detection result of a target object, and an exposure degree, and the image quality detection result comprises a noise degree and/or a blurring degree.

10. The image quality adjustment apparatus according to claim 8, wherein the detection unit is further configured to determine a clip scene detection result and a clip image quality detection result corresponding to the each video clip through scene detection and image quality detection of the plurality of key frames comprised in the each video clip.

11. The image quality adjustment apparatus according to claim 10, wherein the image quality enhancement module is further configured to perform image quality enhancement processing on the each video clip in the multimedia resource respectively, according to a clip image quality enhancement algorithm determined based on the clip scene detection result and the clip image quality detection result corresponding to the each video clip.

* * * * *